United States Patent [19]
Gonzalez

[11] 3,951,718
[45] Apr. 20, 1976

[54] METHOD FOR PRODUCING REINFORCED INSULATING FOAM

[75] Inventor: Rodolfo Gonzalez, Palos Verdes Estates, Calif.

[73] Assignee: McDonnell Douglas Corporation, Long Beach, Calif.

[22] Filed: Jan. 3, 1975

[21] Appl. No.: 538,365

[52] U.S. Cl. .................................. 156/79; 156/148; 220/9 LG; 264/45.3; 264/46.2; 428/86; 428/310; 428/425
[51] Int. Cl.² ........................................... B32B 5/20
[58] Field of Search ........... 156/79, 148; 220/9 LG; 161/90, 160, 53, 89; 264/45.3, 46.2

[56] References Cited
UNITED STATES PATENTS

| | | | |
|---|---|---|---|
| 2,780,090 | 2/1957 | Rasmussen | 156/79 |
| 3,591,494 | 7/1971 | Hoppe | 161/53 |
| 3,647,606 | 3/1972 | Notaro | 161/53 |

Primary Examiner—Edward G. Whitby
Attorney, Agent, or Firm—John P. Scholl; Walter J. Jason; Donald L. Royer

[57] ABSTRACT

A method of making a reinforced insulating foam wherein an open weave fabric is tufted with loops similar to the making of a shag rug in the textile industry. Foaming material is then inserted into the open weave fabric on the side opposite that of the tufted fibers and expanded through the fabric and around the fibers. A rigid non-sticking backing plate is used to direct the foam through the woven fabric such that the fabric is at the surface of the composition and thus may be bonded to the container walls. When foamed downwardly, gravity assists to produce a less dense foam and the fibers are straightened by the foaming action.

2 Claims, 5 Drawing Figures

METHOD FOR PRODUCING REINFORCED INSULATING FOAM

BACKGROUND OF THE INVENTION

A low cost, light density cryogenic insulation capable of resisting high temperature is needed to insulate an expendable cryogenic fuel tank having outer space applications. It must be an efficient thermal insulator to minimize liquid hydrogen boil-off, and have good ablation properties to protect the tank structure from the high temperature encountered during ascent. Ablation tests and thermal conductivity tests performed on polyurethane ablative foams reveal them to be low density efficient ablators and have low thermal conductivity. The fibers added to the foams provide high shear strength to resist thermal contraction loads and a strong base to bond the insulation to the tank structure.

Polyurethane foam eliminates the need of a two-component system, one to satisfy the cryogenic insulation requirements and the other to serve as an ablator to provide high temperature protection. This reduces material and manufacturing costs, and weight, and increases reliability of the material.

SUMMARY OF THE PRESENT INVENTION

In accordance with the present invention, a woven pile textile construction is provided that has an open weave backing and pile yarns or ⅛ inch centers or more, depending on the strength requirements. The fibers may be synthetic or natural polymers. Polyurethane foam, ablative or non-ablative, is then applied to the back side of the pile carpet, which is oriented with the fibers down. After the polyurethane material is applied to the backing during spraying or casting methods, a rigid sheet with a mold release is held against the back to force the polyurethane foaming action through the open weave backing and through the fibers. Holding the pile fabric with the pile down keeps the fibers in a vertical orientation with relation to the backing. The foam expansion from top down also keeps the fibers straight. Downward foaming, because of gravity, also makes the foam less dense than foaming upwardly. The foam/fiber composite can then be cut to the desired thickness and bonded directly to the tank by applying the cryogenic adhesive to the carpet backing.

This insulation material is ideal for a space shuttle drop tank, for example, which requires an efficient cryogenic insulation with high temperature ablative properties to resist ascent thermal environments.

DETAILED DESCRIPTION OF ILLUSTRATIVE EMBODIMENT

Figure 1:
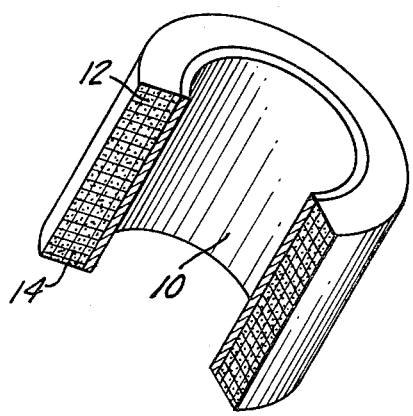
FIG. 1 is a perspective view of a section of a tank, partly in section, having insulation bonded to its outer wall.

Referring now to FIG. 1 there is shown a section 10 of a tank intended to carry cryogenic fluid in a high temperature environment. One such use would be as an expendable cryogenic fuel tank requiring efficient thermal insulation 12 to minimize liquid hydrogen boil-off and have good ablation properties to protect the tank structure from the high temperature encountered during ascent. A low density polyurethane foam has been found to be an excellent insulation for this purpose. Reinforcing fibers 14 dispersed throughout the foam 12 provide high shear strength to resist thermal contraction loads and a strong base to bond the insulation 12 to the tank structure 10. These fibers 14 extend in all three directions, length X, width Y, and thickness Z. The X-Y fibers usually are in a spaced grid layer with the Z fibers looped or stitched through the openings in the grid.

Figure 2:
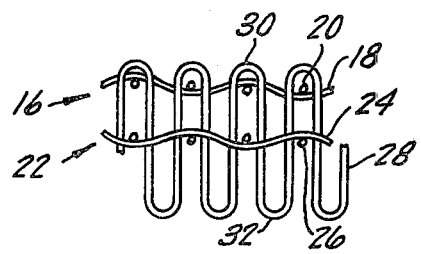
FIG. 2 is a vertical sectional illustration of one form of insulation reinforcement.
Figure 3:
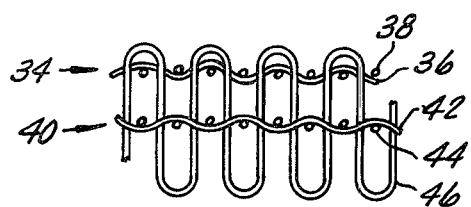
FIG. 3 illustrates another form of reinforcement.
Figure 4:
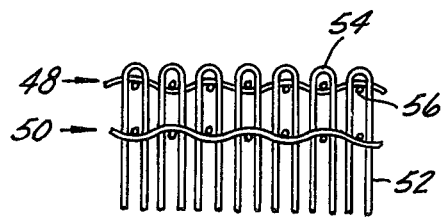
FIG. 4 illustrates yet another form.

FIGS. 2, 3 and 4 show typical fiber reinforcement configurations.

FIG. 2 is a vertical sectional view of a fiber grid consisting of a first layer 16 of spaced X fibers 18 interwoven with spaced Y fibers 20, forming a "fly-screen" configuration. A second layer 22 consisting of spaced X fibers 24 and spaced Y fibers 26 is spaced below the first layer. Any number of layers may be provided, depending upon the thickness of the insulation and the shear strength desired. The spacing between X fibers and between Y fibers may also be varied as desired.

In the configuration in FIG. 2 the Z fibers 28 are formed with continuous spaced top and bottom loops 30, 32. Loop 32 has been pushed down between adjacent Y fibers 20 in layer 16 and Y fibers 26 in layer 22 as a means of inserting Z fibers 28. Loops 30 over Y fibers 20 limit the downward penetration of the Z fibers 28.

In the configuration shown in FIG. 3, fiber layer 34 consists of spaced X and Y fibers 36 and 38 and fiber layer 40, which is spaced from layer 34, consists of spaced X and Y fibers 42, 44. These layers of fibers are similar to the layers 16 and 22 in FIG. 2. The Z fibers 46, however, are stitched through the layers and loop around alternate Y strands 38 and 44 in the two layers. In this manner no unraveling can occur.

In FIG. 4, X-Y fiber layers 48 and 50 are provided, as before. In this embodiment, however, strips of Z fibers 52 are simply looped at 54 over each Y fiber 56 in layer 48 and extend downwardly in a loose pile configuration. Other Z fiber configurations may be used but they all have a common need, that of keeping the Z fibers straight and extending through the depth of the insulation material.

Figure 5:
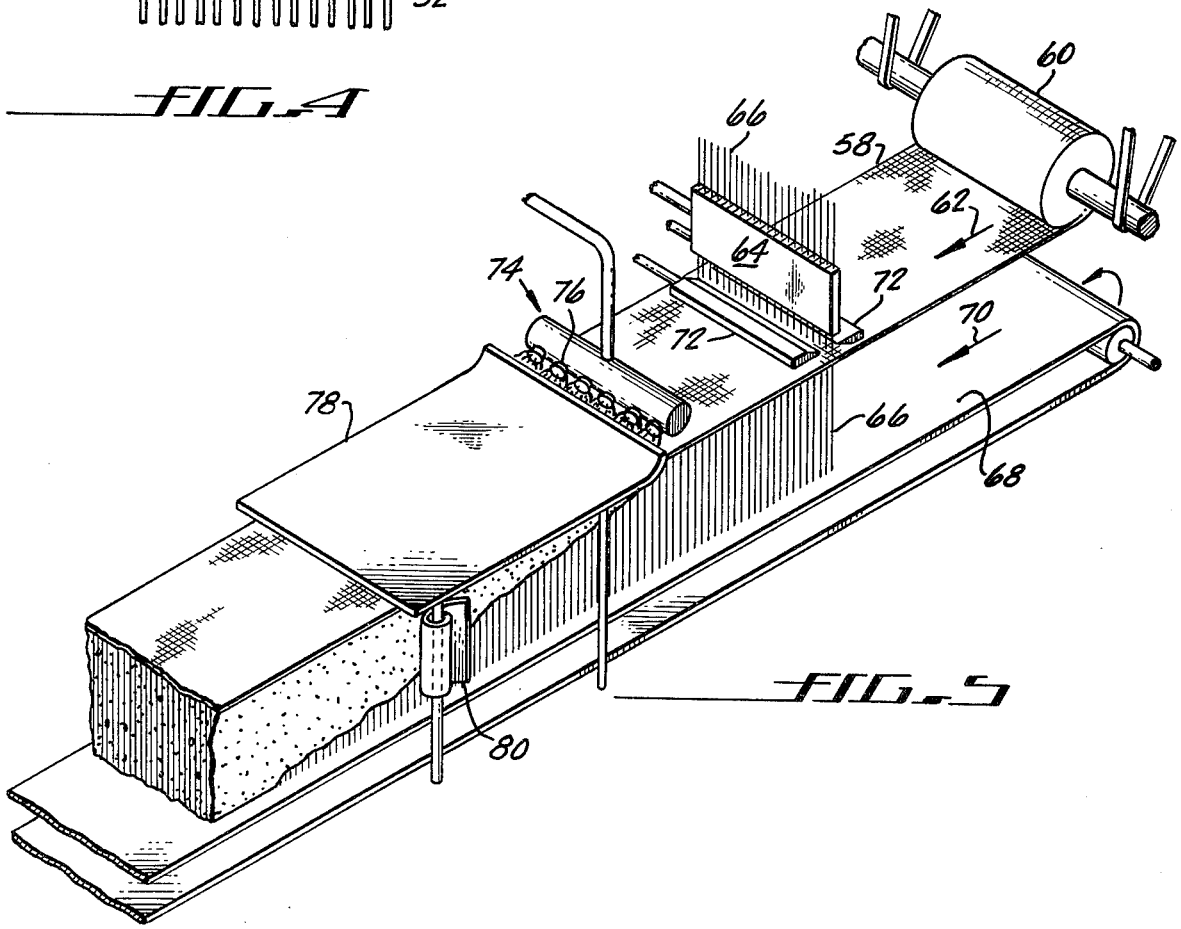
FIG. 5 is a schematic illustration of the foaming operation comprising the present invention.

FIG. 5 illustrates the foaming operation wherein the three dimensional fiber reinforcing matrix is embedded in foam insulation. Here a layer 58 of X-Y fibers is unrolled from roller 60 and is moved in the direction of arrow 62 to the Z fiber insertion station 64. Other layers may be in spaced relationship to layer 58 if desired. At station 64, Z fibers 66 are passed through the X-Y layer or layers. In this illustration an endless belt 68 moves in the direction of arrow 70 and passes under the layer 58. The spacing between belt 68 and the top X-Y layer 58 defines the thickness of the insulation to be formed. Z fibers 66 extend to the endless belt 68 and are then cut above layer 58 by cutter blades 72. Whether Z fibers 66 have been tied or looped over fibers in layers 58 or are sufficiently rigid to remain upright with their ends abutting the endless belt 68 is a matter of choice.

At the next station 74 the foaming chemicals are applied. In one embodiment a polygycol resin, either a polyester or a polyether, is activated with an isocynate catalyst and sprayed through nozzles 76 over the top layer 58. While foaming commences the X-Y layers, Z fibers and endless belt 68 moves under a flat horizontal shield 78 which prevents upward movement of the foam. Side guides 80 limit the lateral movement of the foam, leaving only downward movement, through the X-Y layers to the top surface of endless belt 68. This downward foaming action is completed by the time that portion has moved past the shielded area. Subsequent curing, cutting and handling is done in a conventional manner. The top surface of the fabric should be abraded to remove any foam material in order that the top surface of the fabric may be exposed for subsequent bonding to the structure needing the insulation.

The downward movement of the foam through the fiber array straightens out and keeps straight the Z fibers. It also provides a less dense foam mixture. Both advantages are not present when upward foaming is done.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A method of making a reinforced foam insulation material comprising the steps of:
   a. providing an open weave fabric which allows liquid flow therethrough,
   b. placing said fabric in a substantially horizontal plane,
   c. adding vertically oriented fibers to said fabric and extending said fibers downwardly therefrom,
   d. applying foaming material onto said fabric while said material is moving,
   e. applying a shield over said fabric to prevent upward expansion of said foaming material and to cause downward expansion thereof through said fabric, and
   f. after foaming and curing removing the foam above said fabric to expose the upper surface of said fabric for bonding.

2. A method of making a continuous reinforced foam insulation material comprising the steps of:
   a. providing an open weave fabric which allows liquid flow therethrough,
   b. placing said fabric in a substantially horizontal plane,
   c. adding vertically oriented fibers to said fabric and extending said fibers downwardly therefrom,
   d. moving said fabric and fibers along said horizontal plane past a foaming station
   e. applying foaming material onto said fabric at said foaming station while said fabric and fibers are moving therepast,
   f. applying a shield over said fabric to prevent upward expansion of said foaming material and to cause downward expansion thereof through said fabric wherein said shield is treated with a release agent to prevent adherence of said foam thereto.

* * * * *